United States Patent [19]
Pelz

[11] Patent Number: 5,051,021
[45] Date of Patent: Sep. 24, 1991

[54] SELECTIVELY SEPARABLE ANCHORING AND RETAINING MEANS

[76] Inventor: Peter Pelz, Dieselweg 10, 8192 Geretsried, Fed. Rep. of Germany

[21] Appl. No.: 597,484

[22] Filed: Oct. 10, 1990

[30] Foreign Application Priority Data

Dec. 14, 1989 [DE] Fed. Rep. Germany ......... P3941585

[51] Int. Cl.$^5$ .............................................. B25G 3/00
[52] U.S. Cl. ................................ 403/406.1; 403/353; 248/221.3
[58] Field of Search .................. 403/353, 406.1, 407.1; 248/221.3, 225.1, 223.1, 224.4

[56] References Cited

FOREIGN PATENT DOCUMENTS 7342027 11/1973 Fed. Rep. of Germany .
8134106 11/1981 Fed. Rep. of Germany .

Primary Examiner—Andrew V. Kundrat
Attorney, Agent, or Firm—Hill, Van Santen, Steadman & Simpson

[57] ABSTRACT

A predominantly planar workpiece, having a surface which is punched-in and upwardly-arced, and forms a pocket with a lower surface, having a cutout portion identical to and aligned with a cutout portion of the upwardly-arced surface, such that a grasping device may be inserted into the pocket thus formed, and securely fastened therein, by means of an upwardly-arced semi-circular elevation which transverses the bottom part, such that the grasping device is securely locked within the pocket when inserted therein. A retaining part firmly connected to the grasping device for the acceptance of auxiliary parts remains essentially in the plane of the workpiece.

8 Claims, 1 Drawing Sheet

SELECTIVELY SEPARABLE ANCHORING AND RETAINING MEANS

BACKGROUND OF THE INVENTION

Field of the Invention

The invention is related to a configuration of a workpiece, such that the workpiece is capable of holding a grasping device for fastening auxilary parts.

SUMMARY OF THE INVENTION

It is an object of the present invention to provide a configuration of a workpiece, preferably a planar workpiece, such that the configuration allows for auxiliary parts to be firmly inserted into a grasping device connected to the workpiece, such that the connection is capable of being released without damage to the workpiece.

This object is achieved by a configuration having a bottom part, formed in the shape of a tongue, and having an upwardly arced surface out of the plane of the workpiece, the upwardly arced surface having a punched-in portion which is identically shaped and aligned with the tongue-shaped bottom portion.

The configuration of the invention further provides that the upwardly-arced surface is essentially square.

In a preferred embodiment of the invention, both the punched-in portion and the bottom part have a front, broad region and a back, narrow region. In the bottom part, the back, narrow region lies substantially in the plane of the front, broad region.

Further, the bottom part has a semi-circular elevation which proceeds longitudinally and transversely along the bottom part.

Additionally, an indentation may be provided in the back narrow region of the bottom part for further securing the grasping device within the workpiece configuration.

The invention also relates to a grasping device for connection to the configuration of the workpiece, including a bottom plate, an annular collar, a neck separating the annular collar and the bottom plate, and a retaining part. The bottom plate has a diameter which corresponds to the width of the front broad region of the punched-in portion, and a thickness which corresponds to the clearance between the bottom part and the upwardly-arced surface of the workpiece. The upper annual collar has a diameter which exceeds the width of the back, narrow region of the punched-in portion of the upwardly-arced surface. The maximum diameter of the neck corresponds to the width of the back, narrow region of the punched-in portion. The retaining part allows for the fastening of auxiliary parts to the workpiece via the grasping device. The retaining part may be shaped like a clip, ring, hook, eyelet, or other shape, in accordance with the purpose of the auxiliary part.

In a preferred embodiment, a plastic or metal material is used to construct the grasping device.

The invention allows for the arbitrary placement of workpieces, such as plates, walls, panels, or other preferably planar workpieces, for firmly introducing auxiliary parts, such that the grasping device, which retains the auxiliary part and connects the auxiliary part to the workpiece, may be released without causing damage to the workpiece. The punched-in portions of the upwardly-arced surface form a pocket with the bottom part, such that grasping devices of various shapes may be inserted therein. To insert the grasping device, the disk-shaped bottom plate of the grasping device is inserted into the above described pocket, and is held from the top and bottom by the inner edges of the pocket. To keep the grasping device from sliding out of the front, broad region of the workpiece, a bar-lock is positioned transversely along the bottom part, preferably preceding, or at the start of, the narrow region preceding from front, broad region. Optionally, a corresponding indentation in the back part of the tongue-shaped bottom part for retaining the bottom plate of the grasping device may serve the same purpose. The upper annular collar of the grasping device presses against the upper surface of the upwardly-arced punched-in portion of the workpiece. The retaining part is seated above the annular collar of the grasping device and may be shaped in the form of a hook, eyelet, clip, ring, or another shape, in accordance with the purpose of the auxiliary part.

The grasping member may be manufactured of plastic, metal, or other like materials. The material of the workpiece may be chosen to conform to a special job, and may consist of a hard fiber board, plastic plate composed of a fiber structure, pressboard, planar plastic, felt plate, or plate of iron or other material.

One advantage of the configuration of a workpiece in accordance with the principles of the present invention is that the deformation and punching processes required for the manufacture of a workpiece, having the configuration herein disclosed can be worked into the existing plate-shaped component part without special processing during the compression molding process, given compression molded parts, such as fibrous mat and other such parts, resulting in a cost advantage.

The application of a workpiece configured in accordance with the principles of the present invention includes uses in the furniture industry, as well as other versatile uses.

Further features and advantages of the invention may be derived from the description of the preferred embodiments, below, and in reference to the attached drawings.

DESCRIPTION OF THE PREFERRED EMBODIMENTS

Figure 1:
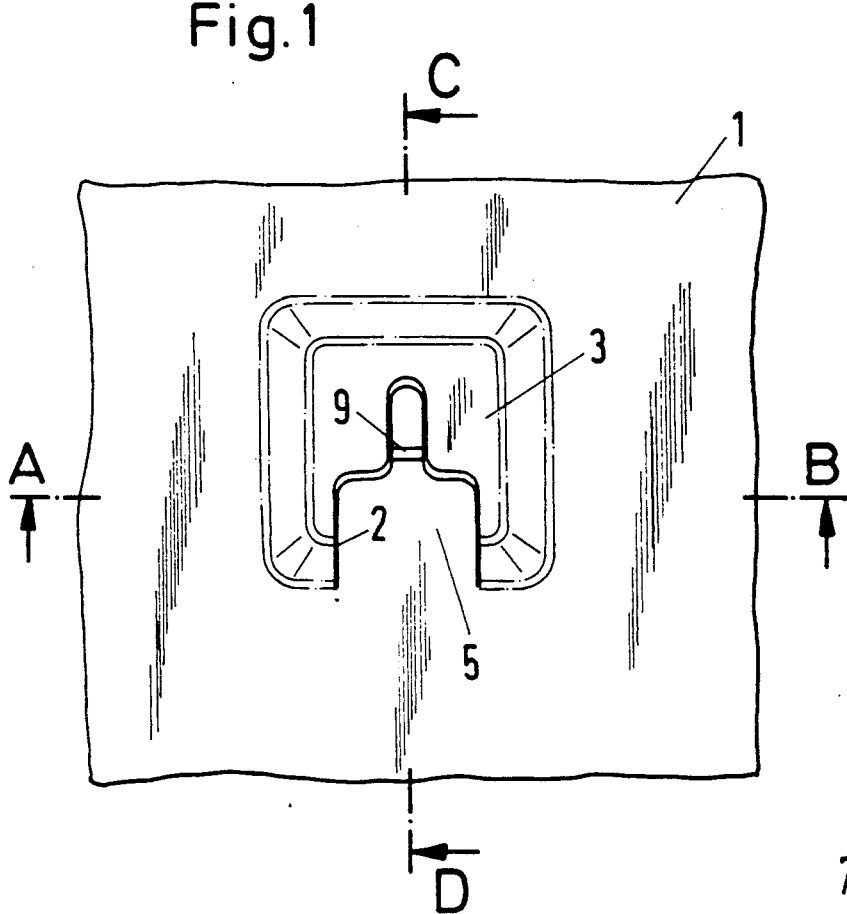
FIG. 1 is a top view of a workpiece configured in accordance with the principles of the present invention.
Figure 3:
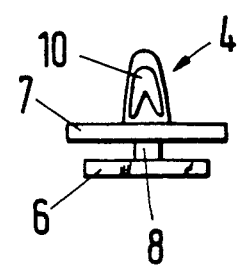
FIG. 3 is a side view of a grasping device designed in accordance with the principles of the present invention.
Figure 2:
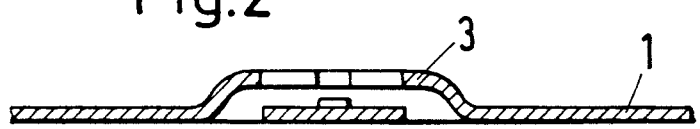
FIG. 2 is a cross-sectional view of FIG. 1 along the line a-b.
Figure 4:
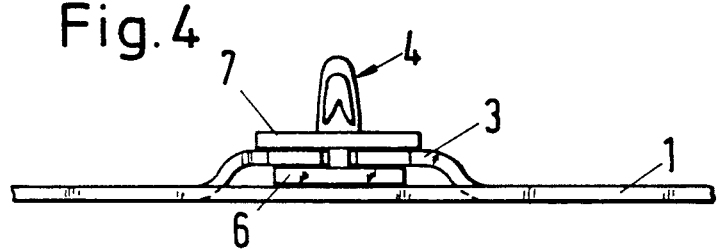
FIG. 4 is a cross-sectional view of FIG. 2 showing the grasping device within the configuration of the workpiece.

FIG. 1 shows a portion of the workpiece 1, which may be a wall, plate, panel or other surface on which the configuration of the invention may be formed, such that auxiliary or accessory parts may be firmly, yet easily detached and secured to the workpiece via a grasping device, as seen in FIG. 3 with auxiliary part 4, which has a retaining part in the form of a clip. The grasping device is secured and a workpiece 1, having an upwardly-arced surface 3, and a tongue-shaped punched-in portion 2 positioned above a tongue-shaped bottom part 5, where the punching process causes the punched-in portion 2 to remain essentially in the plane of the workpiece. The interspace defined by the bottom part 5 and the upwardly-arced surface 3 substantially corresponds to the thickness of a bottom plate 6 of the grasping device 4, shown in detail in FIG. 3. The front region of the punched-in portion 2 substantially corresponds to the diameter of the bottom plate 6 of the grasping device 4 and, in its back, narrow region, corresponds to the diameter of the neck 8, disposed between the bottom plate 6 and the upper annular collar 7 of the grasping device 4. The back, narrow region of the punched-in portion 2 serves for the acceptance of the neck 8 of the grasping device 4, whereby the height of the neck 8 substantially corresponds to the thickness of the material of which the workpiece is composed.

A semi-circular elevation 9 transverses the beginning of the back, narrow region of the tongue-shaped bottom part 5. The elevation 9 serves the purpose of retaining the grasping device 4 in the back, narrow part of the punched-in portion 2. To further secure the grasping device, an indentation may be added to the bottom plate 6 of the grasping device 4 such that the indentation corresponds to the elevation 9 of the narrow part of the bottom part 5.

The retaining part 10 of the grasping device 4 is configured such that it is suitable for the acceptance and fastening of an accessory or auxiliary part, where the shape of the accessory or auxiliary part may be that of a hook, ring, eyelet or clip.

Figure 5:
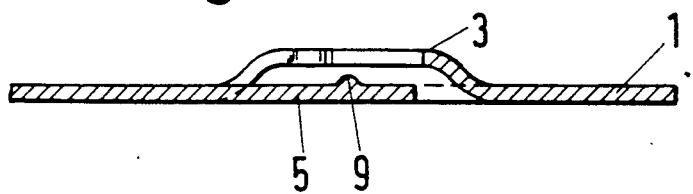
FIG. 5 is a cross-sectional view through FIG. 1 along the line c-d.

The whole system is a simple and effective device for securing auxiliary parts, where the upwardly-arced surface 3 in the workpiece 1, whose tongue-shaped bottom part 5 lies along the planar surface of the workpiece, may only require the addition of an upwardly pressed transverse arch 9, which prevents the grasping device 4 from sliding out of the back, narrow portion of the punched-in portion to FIG. 5 into front, broad region 5 as seen in FIG. 1. The grasping device 4, FIG. 3 is the only auxiliary part required. The grasping device includes a bottom plate 6 at its lower end, an upward annular collar 7, with which it is retained when inserted into the workpiece, a neck 8 disposed between the bottom plate 6 and the upward annular collar 7, and a retaining end which conforms with the needs of a job by varying the shape of the part 10 of FIG. 3 to a suitable configuration for retaining the auxiliary part.

The advantage of the invention lies in the fact that only a single independent part is required to secure an auxiliary part as a result of the inventive configuration, such that the configuration of the workpiece may be achieved during the manufacturing process.

Although the main area of use for the invention is envisioned in the furniture industry, the invention may also be used in other industries, such as the automotive industry, where a workpiece of the configuration herein disclosed may be used for fastening outfitting or lining parts in vehicles.

Although other modifications and changes may be suggested by those skilled in the art, it is the intention of the inventor to embody within the patent warranted hereon all changes and modifications are reasonably and properly come within the scope of their contribution to the art.

I claim:

1. A system for fastening auxiliary parts comprising:
a configuration formed in the surface of a workpiece having a tongue-shaped bottom part and an upwardly-arced surface, said tongue-shaped bottom part having a front, broad region and a back, narrow region, said tongue-shaped bottom part further having an upwardly-arced, elevated barlock disposed transversely along said tongue-shaped bottom part substantially at a juncture of said front, broad region and said back narrow region, and, said upwardly-arced surface having a tongue-shaped punched-in portion aligned with said tongue-shaped bottom part, said tongue-shaped punched-in portion having a front, broad region and a back, narrow region; and a grasping device having a bottom plate, an upper annular collar, a neck, and a retaining part, said bottom plate having a diameter which substantially corresponds to the width of said tongue-shaped punched-in portion of said upwardly-arced surface of said configuration, said bottom plate having a width which substantially corresponds to the width of the interspace between said tongue-shaped bottom part of said configuration and said upwardly-arced surface of said configuration, said bottom plate being selectively inserted into an interspace between said tongue-shaped bottom part of said configuration and said upwardly-arced surface of said configuration, said bar-lock of said configuration securing said bottom plate in the interspace between said bar-lock of said configuration and said back, narrow region of said tongue-shaped bottom part of said configuration, said upper annular collar having a diameter which exceeds the width of said back, narrow region of said tongue-shaped punched-in portion of said configuration, said neck being disposed between said bottom plate and said upper annular collar and said neck having a diameter which corresponds to the width of said back, narrow region of said tongue-shaped punched-in portion of said configuration, and said retaining part having a shape for fastening auxiliary parts.

2. A system as claimed in claim 1, said tongue-shaped bottom part of said configuration forming a substantially planar surface for employing said retaining system along planar surfaces, wherein said back narrow region of said tongue-shaped bottom part of said configuration lies along the horizontal plane of said front, broad region of said tongue-shaped bottom part of said configuration.

3. A system as claimed in claim 1, wherein said upwardly-arced surface further includes a substantially quadratic perimeter, excepting said tongue-shaped punched-in portion.

4. A system as claimed in claim 1, wherein said retaining part is shaped as a clip for fastening auxiliary parts that require such a shape to be secured to said retaining part.

5. A system as claimed in claim 1, wherein said retaining part is shaped as a wing for fastening auxiliary parts that require such a shape to be secured to said retaining part.

6. A system as claimed in claim 1, wherein said retaining part is shaped as a hook for fastening auxiliary parts that require such a shape to be secured to said retaining part.

7. A system as claimed in claim 1, said grasping device further comprising a material selected from the group consisting of plastics and metals.

8. A configuration for securing a grasping device comprising:
- a workpiece having a substantially planar surface and a an upwardly-arced surface;
- said upwardly-arced surface having a tongue-shaped punched-in portion;
- said tongue-shaped punched-in portion having a broad part and a narrow part;
- said substantially planar surface having a tongue-shaped bottom part including an elevated bar-lock;
- said bar-lock disposed transversely along said tongue-shaped bottom part, substantially at a juncture of said broad part and said narrow part of said tongue-shaped punched-in portion; and
- said workpiece being adapted to secure a grasping device between said bar-lock and a back of said narrow part of said tongue-shaped punched-in portion.

* * * * *